United States Patent
Ebiko et al.

(10) Patent No.: US 8,700,046 B2
(45) Date of Patent: Apr. 15, 2014

(54) MOBILE COMMUNICATION SYSTEM, NETWORK MANAGEMENT APPARATUS, MACROCELL BASE STATION APPARATUS, AND INTERFERENCE CONTROL METHOD

(75) Inventors: Keisuke Ebiko, Kanagawa (JP); Akito Fukui, Osaka (JP); Toyoki Ue, Kanagawa (JP)

(73) Assignee: Panasonic Corporation, Osaka (JP)

( * ) Notice: Subject to any disclaimer, the term of this patent is extended or adjusted under 35 U.S.C. 154(b) by 24 days.

(21) Appl. No.: 13/389,312

(22) PCT Filed: Aug. 18, 2010

(86) PCT No.: PCT/JP2010/005100
§ 371 (c)(1),
(2), (4) Date: Feb. 7, 2012

(87) PCT Pub. No.: WO2011/021388
PCT Pub. Date: Feb. 24, 2011

(65) Prior Publication Data
US 2012/0135743 A1   May 31, 2012

(30) Foreign Application Priority Data

Aug. 19, 2009 (JP) .................................. 2009-190431

(51) Int. Cl.
*H04W 40/00* (2009.01)
(52) U.S. Cl.
USPC ........ 455/449; 455/452.2; 455/63.2; 455/444
(58) Field of Classification Search
USPC ............ 455/449, 444, 452.2, 63.1, 63.2, 63.3
See application file for complete search history.

(56) References Cited

U.S. PATENT DOCUMENTS

| | | |
|---|---|---|
| 2009/0081970 A1 | 3/2009 | Yavuz et al. |
| 2009/0323663 A1 | 12/2009 | Nakatsugawa |

(Continued)

FOREIGN PATENT DOCUMENTS

| | | |
|---|---|---|
| CN | 101094213 A | 12/2007 |
| JP | 2008-252253 A | 10/2008 |

(Continued)

OTHER PUBLICATIONS

3GPP TS 36.423 V8.4.0 (Dec. 2008), Evolved Universal Terrestrial Radio Access Network (E-TRAN); X2 application protocol (X2AP) (Release 8).

(Continued)

*Primary Examiner* — Vladimir Magloire
(74) *Attorney, Agent, or Firm* — Pearne & Gordon LLP

(57) ABSTRACT

A mobile communication system wherein the upstream radio channel interference of a macrocell connection terminal with a femtocell base station can be reduced while the consumption of radio resources caused by increase in signaling is being suppressed. The macrocell connection terminal (401) performs, based on an instruction from a macrocell base station (402), an upstream channel transmission and further reports a peripheral-femtocell detection result obtained by a measuring unit to the macrocell base station. The macrocell base station (402) instructs the terminal to perform a peripheral-femtocell detection. The identifier of the terminal and the peripheral-femtocell detection result obtained by the terminal are transmitted to a network management apparatus (404). An interference reduction instruction (frequency band allocation) and the identifier of the terminal to be interference-controlled are received from the network management apparatus, and the frequency band allocation in the upstream channel transmission of the terminal to be interference-controlled is so controlled as to satisfy the interference reduction instruction.

9 Claims, 12 Drawing Sheets

(56) References Cited

U.S. PATENT DOCUMENTS

| | | | |
|---|---|---|---|
| 2010/0099449 A1* | 4/2010 | Borran et al. | 455/501 |
| 2010/0113029 A1 | 5/2010 | Bjorken | |
| 2010/0298005 A1* | 11/2010 | Yavuz et al. | 455/452.2 |
| 2012/0149363 A1* | 6/2012 | Faerber et al. | 455/423 |

FOREIGN PATENT DOCUMENTS

| | | | |
|---|---|---|---|
| JP | 2010-16420 A | 1/2010 | |
| JP | 2010-524293 A | 7/2010 | |
| WO | 2008121037 A1 | 10/2008 | |

OTHER PUBLICATIONS

International Search Report for PCT/JP2010/005100 dated Sep. 14, 2010.

Search Report for Chinese Patent Application No. 201080035106.5 dated Nov. 27, 2013.

* cited by examiner

MOBILE COMMUNICATION SYSTEM, NETWORK MANAGEMENT APPARATUS, MACROCELL BASE STATION APPARATUS, AND INTERFERENCE CONTROL METHOD

TECHNICAL FIELD

The present invention relates to a mobile communication system, network management apparatus, macro cell base station apparatus and interference control method designed to reduce interference of uplink radio channels.

BACKGROUND ART

Studies are being carried out on installation of a radio communication base station apparatus using a narrow cell (femtocell) as its coverage having a cell radius of several tens of meters or less in a general household or building like office (referred to as "femtocell base station," or "Home Node-B," hereinafter referred to as "femtocell base station" or "HNB"). FIG. 1 shows a radio system configuration when a femtocell base station is installed. Portable terminal 102 (hereinafter referred to as "femtocell connected terminal" or "HUE") located in a building where femtocell base station 101 is installed performs data transmission with femtocell base station 101 via a radio channel. Femtocell base station 101 uses fixed network 103 (e.g., xDSL, FTTH) such as an optical fiber introduced into each household as a backbone and is connected to core network 105 via Internet 104 or the like. Installation information of femtocell base station 101 is managed by network management apparatus 106 in the core network.

Compared to a conventionally used wide-area cell (that is, macro cell) having a cell radius of on the order of 0.5 to 1.5 kilometers, the femtocell has the following technological features.

(1) A femtocell base station has low transmission power and a narrow cell radius.
(2) Not many terminals are simultaneously connectable to a femtocell base station.

To be more specific, while several tens of terminals or more are simultaneously connectable to a macro cell, several terminals are simultaneously connectable to a femtocell.

(3) It is difficult for a communication carrier to design the layout of a femtocell in advance.
(4) A user's fixed network is incorporated in a network configuration. In the macro cell, terminal 108 is connected to core network 105 via base station 107 and radio access network 109 managed by a communication carrier.

When femtocell base stations are widely spread in an urban area, it is anticipated that it will be difficult to secure femtocell-specific frequency bands because existing cellular systems use all operating frequency bands. Therefore, in the urban area, a macro cell and femtocell are assumed to be hierarchically arranged (that is, hierarchic cell arrangement). That is, the macro cell and femtocell are assumed to share the same frequency band in the same region. Furthermore, only registered users (CSG: Closed Subscriber Group) may be authorized to make connections to femtocell base stations for the purpose of preferentially providing a communication service to users who install the femtocell base stations.

In such an operation of a hierarchic cell arrangement of a macro cell and femtocell, interference of uplink radio channels between the macro cell and femtocell becomes problematic. That is, a throughput increase in one cell may lead to an increase in interference/throughput decrease in the other, that is, occurrence of trade-off.

One example of radio interference between the macro cell and femtocell can be radio interference on an uplink that a macro cell connected terminal provides to a femtocell base station. Especially, when propagation loss between the macro cell base station and macro cell connected terminal grows, the radio transmission power of the macro cell connected terminal increases, and therefore the problem of interference provided from the macro cell connected terminal to the femtocell base station becomes serious. For this reason, when a CSG femtocell base station is installed, countermeasures need to be taken against interference with the femtocell base station from the macro cell connected terminal that cannot be connected to the femtocell base station.

Conventionally, when performing uplink multicarrier transmission such as OFDMA or SC-FDMA, a method is disclosed whereby different frequency bands are assigned to a plurality of cells in assignment of resource blocks used for uplink data transmission to thereby reduce interference between cells (e.g., see Patent Literature 1). As described in Patent Literature 1, uplink interference information is exchanged between base stations or between a base station and network management apparatus, and frequency band assignment so as to reduce uplink interference is determined.

FIG. 2 shows a sequence diagram of an interference reduction method described in Patent Literature 1. In FIG. 2, base stations 203 (Node-B1) and 204 (Node-B2) located close to each other measure the amount of interference of an uplink radio channel (ST201) and report the measured amount of interference to network management apparatus 205 (NW Node) (ST202). Furthermore, terminals 201 (UE1) and 202 (UE2) connected to base stations 203 and 204 respectively measure the reception levels of respective downlinks (ST203) and report the measurement results to network management apparatus 205 via the base stations (ST204). Network management apparatus 205 assigns uplink frequency bands used in the respective cells so that interference between the cells is reduced most based on the information reported from the base stations or terminals (ST205). Network management apparatus 205 then reports the frequency band assignment (that is, operating bands) to base stations 203 and 204 (ST206). Base stations 203 and 204 perform uplink scheduling according to the reports (ST207) and assign uplink operating frequency bands to the terminals (ST208).

Here, according to the method shown in FIG. 2, network management apparatus 205 adjusts the operating frequency bands based on interference information of all cells. On the other hand, as another method, information on the amount of interference can also be directly exchanged between base stations 203 and 204 as shown in ST209 of FIG. 3. For example, the 3GPP (3rd Generation Partnership Project) LTE (Long term evolution) standard defines a signal for directly exchanging information on the amount of uplink interference per band (UL interference control signaling (OI, HII) report) between base stations (see Non-Patent Literature 1). To be more specific, "UL Interference Overload Indication" is defined as the signal for reporting the amount of uplink interference per band. Furthermore, "UL High Interference Indication" is defined as a signal for warning neighboring cells that the own cell will use a specific frequency band. The base station that receives these signals performs frequency band assignment different from that of the neighboring cells (ST210) and transmits information on the frequency band assignment to the terminal (ST211). The amount of uplink interference is thereby reduced.

CITATION LIST

Patent Literature

PTL 1
US Patent Application Publication No. 2009/0081970

Non-Patent Literature

NPL 1
3GPP standardization document TS36.423 ver. 8.4.0 (December 2008)

SUMMARY OF INVENTION

Technical Problem

However, when the above-described interference reduction method is simply applied to a hierarchic cell arrangement between a macro cell and femtocell, the following problems occur.

The conventional interference reduction method is assumed to mainly handle uplink interference between neighboring macro cells. For this reason, since it is a terminal located at a macro cell edge that provides strong interference with a neighboring macro cell, it is easy to both identify a terminal to which frequency band limitation is applied and apply frequency band limitation to the terminal.

On the other hand, in the case of a hierarchic cell arrangement, since a femtocell is arranged at an arbitrary place in a macro cell, a terminal acting as an interference source for the femtocell is not always located at a macro cell edge. For example, as shown in FIG. 4, consider a case where femtocell base station 203 is arranged at the center of a macro cell. A main interference source for femtocell base station 203 is not macro cell connected terminal 202 (MUE1) located at the macro cell edge but macro cell connected terminal 202 (MUE2) located near femtocell base station 203.

That is, when the interference control method shown in FIG. 3 is used, macro cell connected terminal 202 (MUE1) located at the cell edge is identified as the terminal acting as the interference source, and therefore even when interference control is performed using this method, the femtocell base station and macro cell base station cannot identify the terminal actually acting as the interference source in the hierarchic cell arrangement. Therefore, using the method of reducing interference between neighboring cells shown in FIG. 3 causes not only appropriate frequency band limitation to be not applied to macro cell connected terminal 202 (MUE2) acting as the interference source but also frequency band limitation to be applied to macro cell connected terminal 202 (MUE1) not acting as the interference source, leading to unnecessary deterioration of the transmission throughput.

Thus, in the case of a hierarchic cell arrangement, it is not possible to use an identification standard for an interference source terminal according to the conventional method of reducing interference between neighboring macro cells as is.

Therefore, in the case of a hierarchic cell arrangement, it is necessary to grasp an arrangement relationship between a terminal and femtocell, and explicitly limit the terminal acting as the interference source. That is, information needs to be collected from all terminals and base stations to investigate terminals acting as interference sources for the femtocell.

However, when information is collected from all terminals and base stations to investigate terminals acting as interference sources for the femtocell every time the femtocell requests a reduction of interference, radio resources are consumed by signaling and the efficiency of data transmission deteriorates. Furthermore, delays result from the collection of information and frequency band assignment processing, and the response of interference control to a change in the radio environment deteriorates. The above-described problems become more serious as the number of femtocell base stations and the number of terminals located in the macro cell increase.

It is an object of the present invention to provide a mobile communication system, network management apparatus, macro cell base station apparatus and interference control method for reducing uplink radio channel interference from a macro cell connected terminal to a femtocell base station.

Solution to Problem

A mobile communication system according to the present invention is a mobile communication system that adopts a configuration including a macro cell base station, a macro cell connected terminal wirelessly connected to the macro cell base station, a femtocell base station, a femtocell connected terminal wirelessly connected to the femtocell base station and a network management apparatus connected to the femtocell base station and the macro cell base station, wherein the macro cell connected terminal includes a measuring section that detects whether or not a femtocell base station is located in the periphery and a transmitting section that transmits, when the presence of the femtocell base station is detected, the detection result of the peripheral femtocell base station to the macro cell base station, the macro cell base station includes a transmitting section that transmits an identifier of the macro cell connected terminal and the peripheral femtocell detection result based on the detection result transmitted from the macro cell connected terminal to the network management apparatus, a receiving section that receives an interference reduction instruction transmitted from the network management apparatus and a scheduler section that limits assignment of a frequency band to the macro cell connected terminal based on the interference reduction instruction, the femtocell base station includes an interference control section that transmits, upon deciding that uplink quality of the own cell cannot be maintained, an interference reduction request to the network management apparatus and a scheduler section that limits assignment of a frequency band to the femtocell connected terminal based on the interference control instruction transmitted from the network management apparatus, the network management apparatus includes a storage section that stores information on a correspondence relationship between the identifier of the macro cell connected terminal and an identifier of the femtocell base station, a receiving section that receives an interference reduction request transmitted from the femtocell base station, an interference control section that determines frequency band assignment so that operating frequency bands of the femtocell base station and the macro cell base station do not overlap with each other for the macro cell connected terminal in the correspondence relationship with the femtocell base station based on the received interference reduction request and the information on the correspondence relationship stored in the storage section and a transmitting section that transmits an interference reduction instruction including information of the frequency band assignment to the macro cell base station.

A network management apparatus according to the present invention is provided with a storage section that stores information on a correspondence relationship between an identifier of a macro cell connected terminal wirelessly connected to a macro cell base station and an identifier of a femtocell base station detected by the macro cell connected terminal, a receiving section that receives an interference reduction request transmitted from the femtocell base station, a selection section that selects the identifier of the macro cell connected terminal corresponding to the femtocell base station which is the sender of the interference reduction request based on the correspondence relationship information, an interference control section that determines frequency band assignment so that operating frequency bands of the femtocell base station and the macro cell base station do not overlap with each other based on the interference reduction request and the correspondence relationship information stored in the storage section and a transmitting section that transmits and interference reduction instruction including the identifier of the macro cell connected terminal selected by the selection section and the information of the frequency band assignment to the macro cell base station.

A macro cell base station apparatus according to the present invention includes an instruction section that instructs a macro cell connected terminal connected to the own cell to detect a cell identifier of a femtocell base station located in the periphery, a receiving section that receives the detection result of the peripheral femtocell base station transmitted from the macro cell connected terminal, an interference reduction instruction transmitted from the network management apparatus and terminal identifier information, a transmitting section that transmits an identifier of the macro cell connected terminal and the peripheral femtocell detection result to the network management apparatus based on the detection result from the macro cell connected terminal, an interference control section that adjusts radio resource assignment to the macro cell connected terminal specified by the identifier information based on the interference reduction instruction, and a scheduler section that limits frequency band assignment to the macro cell connected terminal according to the adjustment of the interference control section.

An interference control method according to the present invention is an interference control method used for a mobile communication system provided with a macro cell base station, a femtocell base station and a network management apparatus, including the macro cell connected terminal wirelessly connected to the macro cell base station detecting whether or not the femtocell base station is located in the periphery and transmitting, when the presence of the femtocell base station is detected, the detection result of the peripheral femtocell base station to the macro cell base station, the macro cell base station transmitting an identifier of the macro cell connected terminal and the peripheral femtocell detection result to the network management apparatus based on the detection result transmitted from the macro cell connected terminal, receiving an interference reduction instruction transmitted from the network management apparatus and limiting frequency band assignment to the macro cell connected terminal based on the received interference reduction instruction, the femtocell base station transmitting, upon deciding that uplink quality of the own cell cannot be maintained, an interference reduction request to the network management apparatus and limiting frequency band assignment to the terminal wirelessly connected to the competent femtocell based on the interference control instruction transmitted from the network management apparatus, the network management apparatus maintaining information on a correspondence relationship between the identifier of the macro cell connected terminal and an identifier of the femtocell base station, receiving an interference reduction request transmitted from the femtocell base station, determining frequency band assignment so that operating frequency bands of the femtocell base station and the macro cell base station do not overlap with each other for the macro cell connected terminal in the correspondence relationship with the femtocell base station based on the received interference reduction request and the correspondence relationship information stored in the storage section and transmitting an interference reduction instruction including the information of the frequency band assignment to the macro cell base station.

Advantageous Effects of Invention

The present invention can provide a mobile communication system, network management apparatus, base station apparatus and interference control method for reducing interference with an uplink radio channel from a macro cell connected terminal to a femtocell base station.

DESCRIPTION OF EMBODIMENTS

Figure 1:
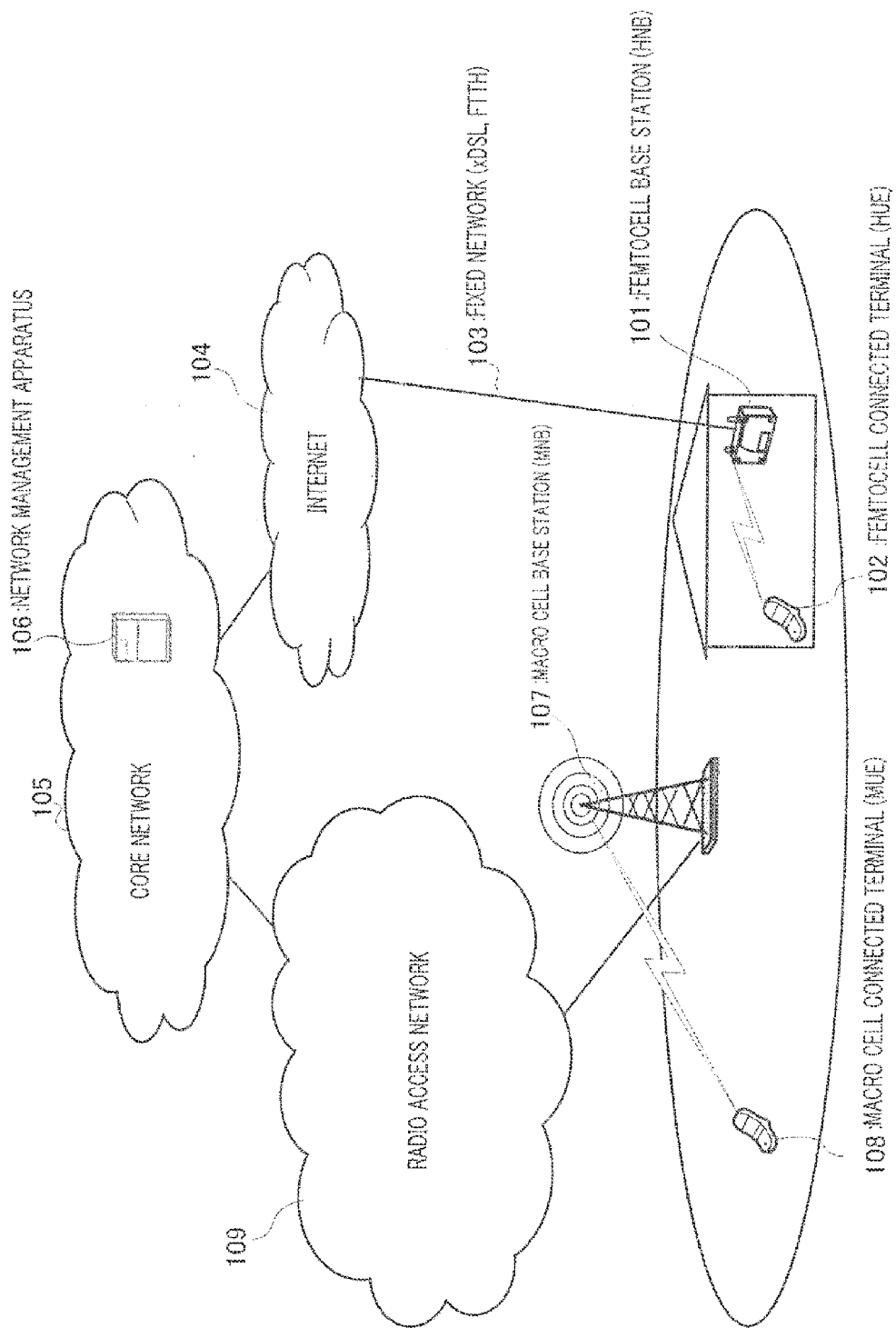
FIG. 1 is a diagram illustrating a configuration of a mobile communication system.
Figure 2:
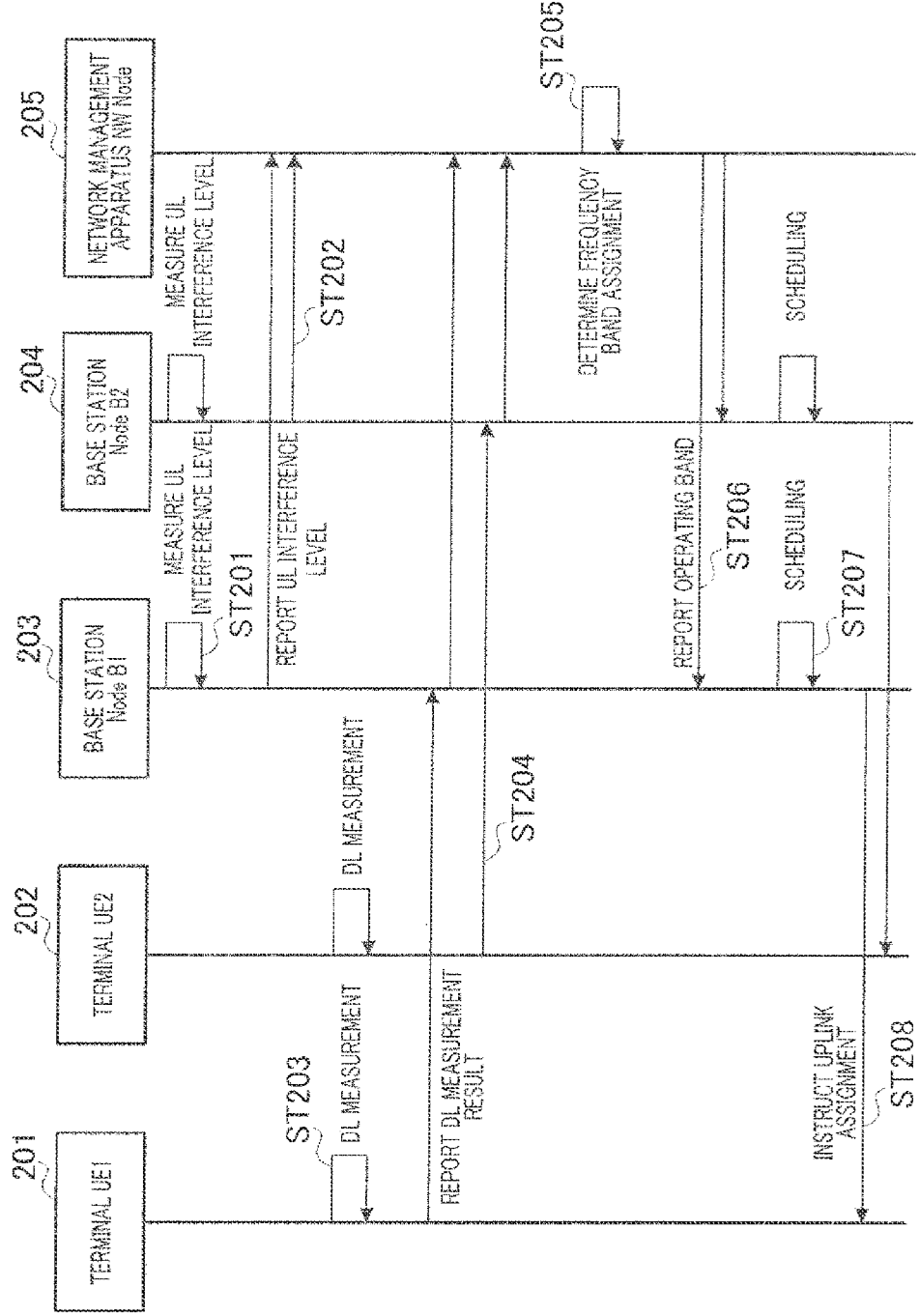
FIG. 2 is a sequence diagram illustrating an interference control procedure according to Patent Literature 1.
Figure 3:
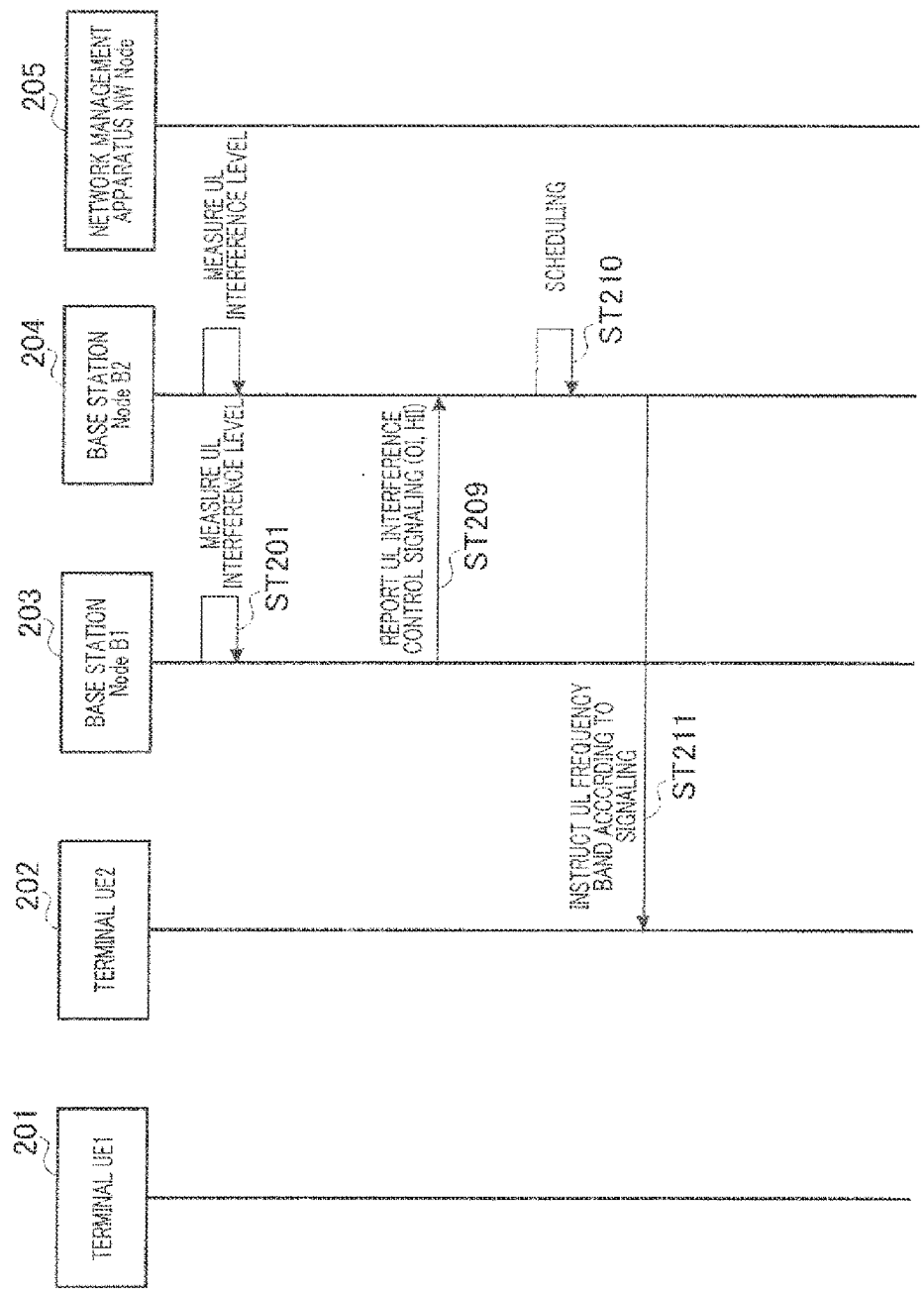
FIG. 3 is a sequence diagram illustrating an interference control procedure according to Non-Patent Literature 1.
Figure 4:
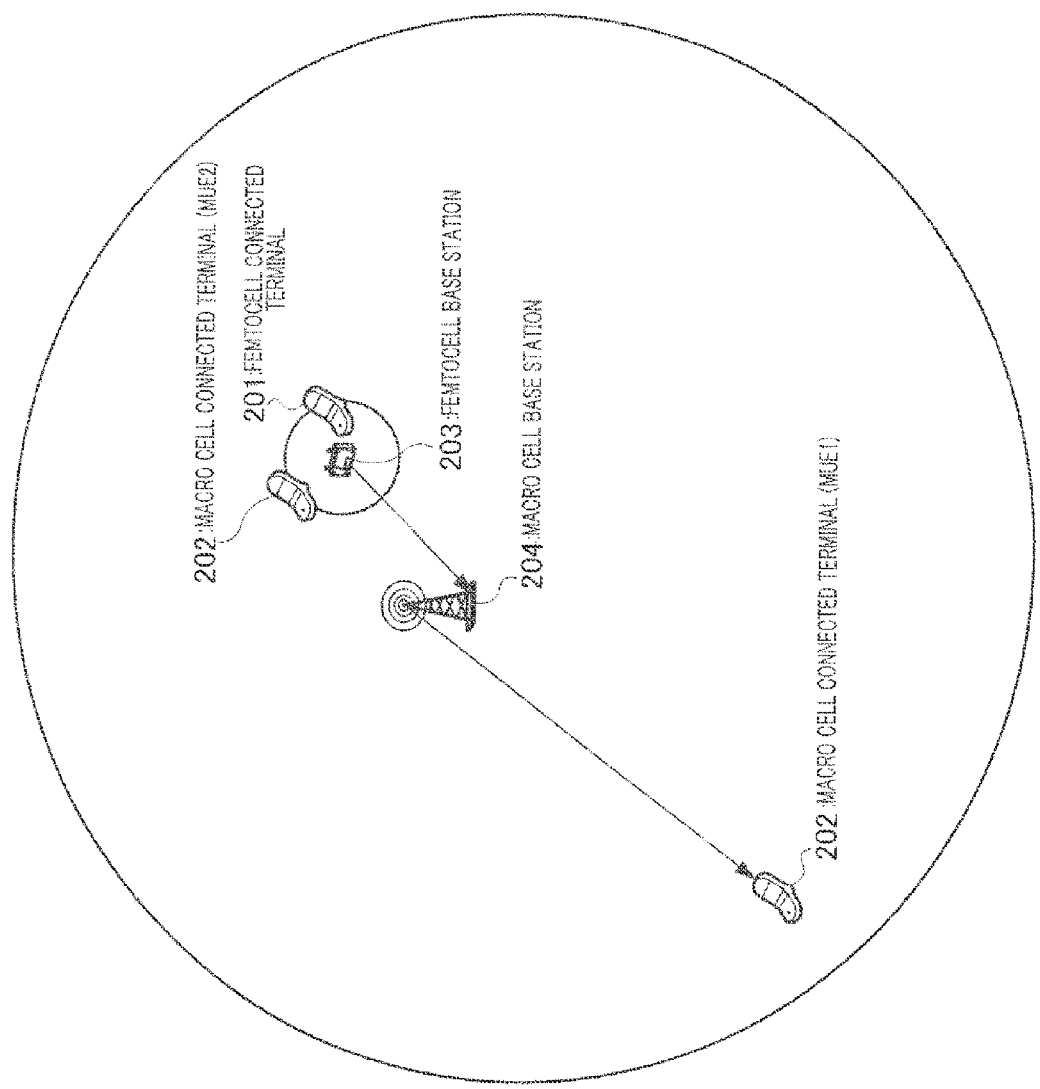
FIG. 4 is a diagram illustrating an example of a hierarchic cell arrangement.

Hereinafter, embodiments of the present invention will be described in detail with reference to the accompanying drawings. The same components among the embodiments will be assigned the same reference numerals and overlapping descriptions thereof will be omitted.

Embodiment 1

Figure 5:
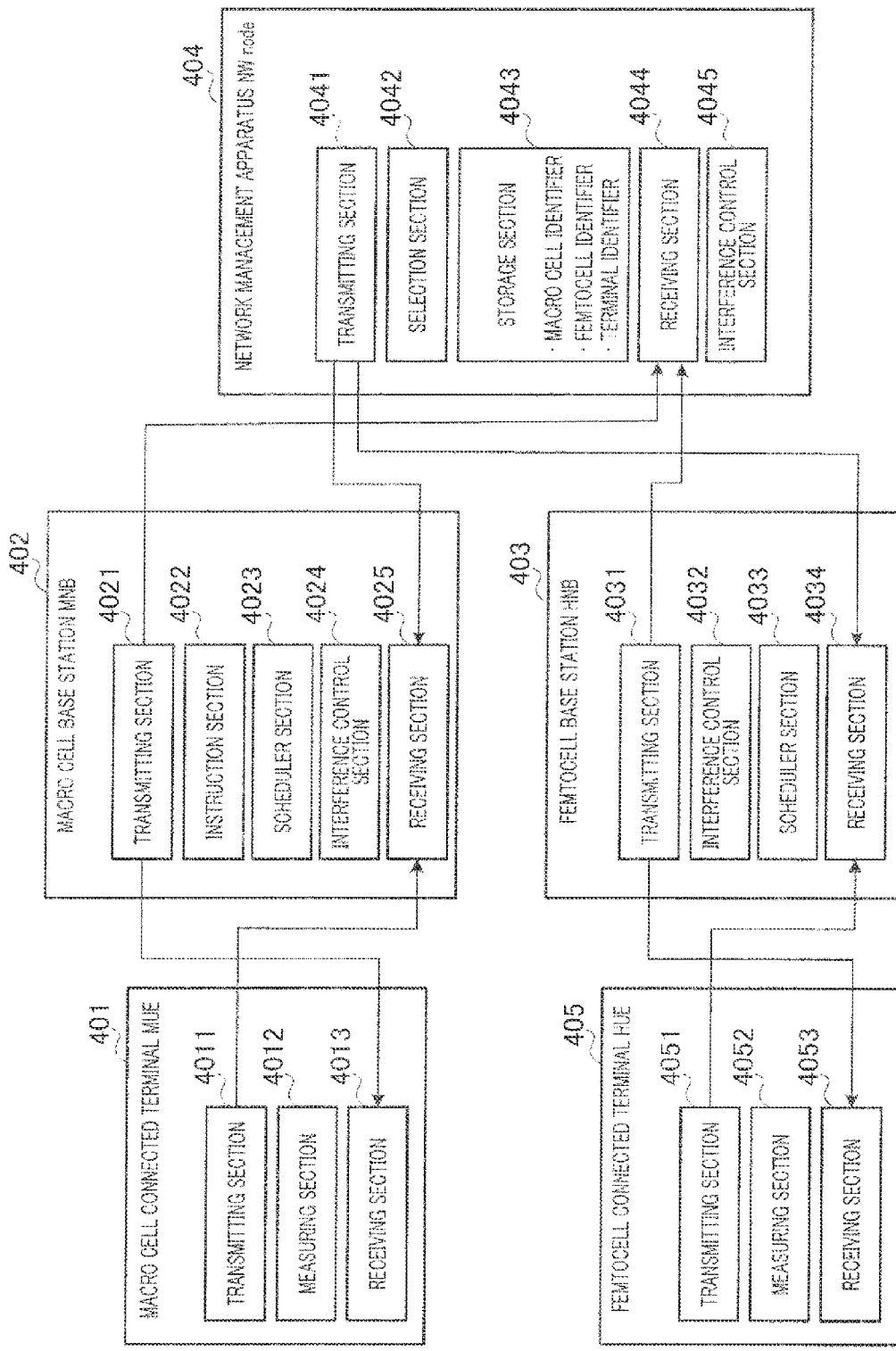
FIG. 5 is a block diagram illustrating a configuration of a mobile communication system according to Embodiment 1 of the present invention.

FIG. 5 is a block diagram illustrating a configuration of a mobile communication system according to Embodiment 1 of the present invention. In FIG. 5, descriptions of function blocks not directly related to interference reduction are omitted.

In FIG. 5 the mobile communication system includes macro cell connected terminal (MUE) 401, macro cell base station (MNB) 402, femtocell base station (HNB) 403, network management apparatus (NW node) 404 and femtocell connected terminal (HUE) 405.

Macro cell connected terminal 401 includes transmitting section 4011, measuring section 4012 and receiving section 4013.

Transmitting section 4011 transmits a signal to macro cell base station 402 over an uplink. A frequency band used in this transmission is set based on an uplink assignment instruction received from macro cell base station 402 via receiving section 4013.

Measuring section 4012 detects femtocell base station 403 located in the periphery. That is, measuring section 4012 detects whether or not a femtocell is located in the periphery. This detection may be performed based on an instruction received from macro cell base station 402 via receiving section 4013 or based on a condition set in each macro cell connected terminal 401 (e.g., a predetermined cycle defined in a cell search procedure or the like). To be more specific, measuring section 4012 measures the reception level per cell of a downlink common signal (reference signal or the like) transmitted from femtocell base station 403 of each cell and decides whether or not a downlink common signal from the femtocell can be received based on the measurement result. When the reception level is a predetermined level or above, measuring section 4012 decides that the femtocell is located in the periphery. Furthermore, measuring section 4012 detects femtocell base station identification information included in a downlink common signal having a reception level equal to or above the predetermined level (that is, femtocell base station identifier). This makes it possible to detect that the femtocell is located in the periphery and identify femtocell base station 403 corresponding to the femtocell. The detection result is transmitted to macro cell base station 402 via transmitting section 4011 with identification information of the terminal (that is, terminal identifier) added thereto.

Macro cell base station 402 includes transmitting section 4021, instruction section 4022, scheduler section 4023, interference control section 4024 and receiving section 4025.

Instruction section 4022 creates information for instructing each terminal connected to the base station to detect a peripheral femtocell and transmits the information to each terminal via transmitting section 4021.

Receiving section 4025 receives the femtocell detection result detected in each terminal. This received femtocell detection result (including the femtocell base station identifier and terminal identifier) is transmitted to network management apparatus 404 via transmitting section 4021.

Furthermore, receiving section 4025 receives an interference reduction instruction received from network management apparatus 404. The interference reduction instruction includes frequency band assignment and an identifier of the terminal subject to interference control. The identifier of the terminal subject to interference control may not be included in the interference reduction instruction but may be transmitted together with the interference reduction instruction as information different from the interference reduction instruction.

Interference control section 4024 extracts the interference reduction instruction from the received signal received by receiving section 4025 and outputs the interference reduction instruction to scheduler section 4023.

Scheduler section 4023 limits frequency band assignment to macro cell connected terminal 401 subject to interference control based on the interference reduction instruction received from interference control section 4024. To be more specific, scheduler section 4023 assigns an operating band to macro cell connected terminal 401 subject to interference control from the band indicated by the frequency band assignment information included in the interference reduction instruction. This operating band assignment result is transmitted to macro cell connected terminal 401 subject to interference control via transmitting section 4021 through a downlink radio channel.

Femtocell base station 403 includes transmitting section 4031, interference control section 4032, scheduler section 4033 and receiving section 4034.

Receiving section 4034 detects an uplink interference level of another cell connected terminal (e.g., macro cell connected terminal 401) based on the reception level of an uplink reference signal transmitted from femtocell connected terminal 405 located in the femtocell of femtocell base station 403. To be more specific, an expected value of the reception level of an uplink reference signal transmitted from femtocell connected terminal 405 located in the femtocell of femtocell base station 403 is known beforehand. Therefore, an uplink interference level from the other cell connected terminal is obtained by subtracting the expected value from the actually measured reception level of the uplink reference signal transmitted from femtocell connected terminal 405.

Interference control section 4032 compares the uplink interference level obtained from receiving section 4034 with a predetermined threshold. When the uplink interference level is greater than the predetermined threshold, interference control section 4032 decides that uplink quality of the own cell cannot be maintained because the uplink interference level is high and transmits an interference reduction request to network management apparatus 404 via transmitting section 4031. This interference reduction request includes at least information on the uplink interference level, and in addition, may also include the amount of uplink traffic of the femtocell or a desired frequency band in the femtocell.

Receiving section 4034 receive an interference control instruction received from network management apparatus 404. This interference control instruction includes frequency band assignment.

Interference control section 4032 extracts the interference control instruction from the received signal received by receiving section 4034 and outputs the interference control instruction to scheduler section 4033.

Scheduler section 4033 limits frequency band assignment used for uplink transmission to femtocell connected terminal 405 subject to interference control based on the interference control instruction received from interference control section 4032. To be more specific, scheduler section 4033 assigns an operating band to femtocell connected terminal 405 subject to interference control from the band indicated by the frequency band assignment information included in the interference control instruction. This operating band assignment result is transmitted to femtocell connected terminal 405 subject to interference control via transmitting section 4031 through a downlink radio channel.

Network management apparatus 404 includes transmitting section 4041, selection section 4042, storage section 4043, receiving section 4044 and interference control section 4045.

Receiving section 4044 receives the femtocell detection result transmitted from macro cell base station 402. As described above, this femtocell detection result includes the terminal identifier of macro cell connected terminal 401 that performed femtocell detection and the identifier of detected femtocell base station 403.

Furthermore, receiving section 4044 receives the interference reduction request transmitted from femtocell base station 403.

Storage section 4043 stores the femto detection result received by receiving section 4044. To be more specific, storage section 4043 stores an identifier of each femtocell located in the macro cell of each macro cell base station in association with an identifier of a macro cell connected terminal located near the femtocell.

Selection section 4042 selects a terminal identifier associated in storage section 4043 with the identifier of femtocell base station 403, which is the sender of the interference reduction request received by receiving section 4044.

When receiving section 4044 receives the interference reduction request from femtocell base station 403, interference control section 4045 determines uplink frequency band assignment so that the operating frequency band of the femtocell, which is the sender of the interference reduction request, and the operating frequency band of the macro cell connected terminal located near femtocell base station 403 do not overlap with each other. Interference control section 4045 then transmits an interference reduction instruction to macro cell base station 402. This interference reduction instruction includes frequency band assignment and an identifier of the terminal subject to interference control. Furthermore, interference control section 4045 can transmit not only an interference reduction instruction to macro cell base station 402 but also an interference control instruction (frequency band assignment) to femtocell base station 403, which is the sender of the interference reduction request.

Femtocell connected terminal 405 includes transmitting section 4051, measuring section 4052 and receiving section 4053. Functions of the respective sections are equivalent to those of the respective function sections of macro cell connected terminal 401. An identifier of femtocell connected terminal 405 is registered with femtocell base station 403 in advance.

Figure 6:
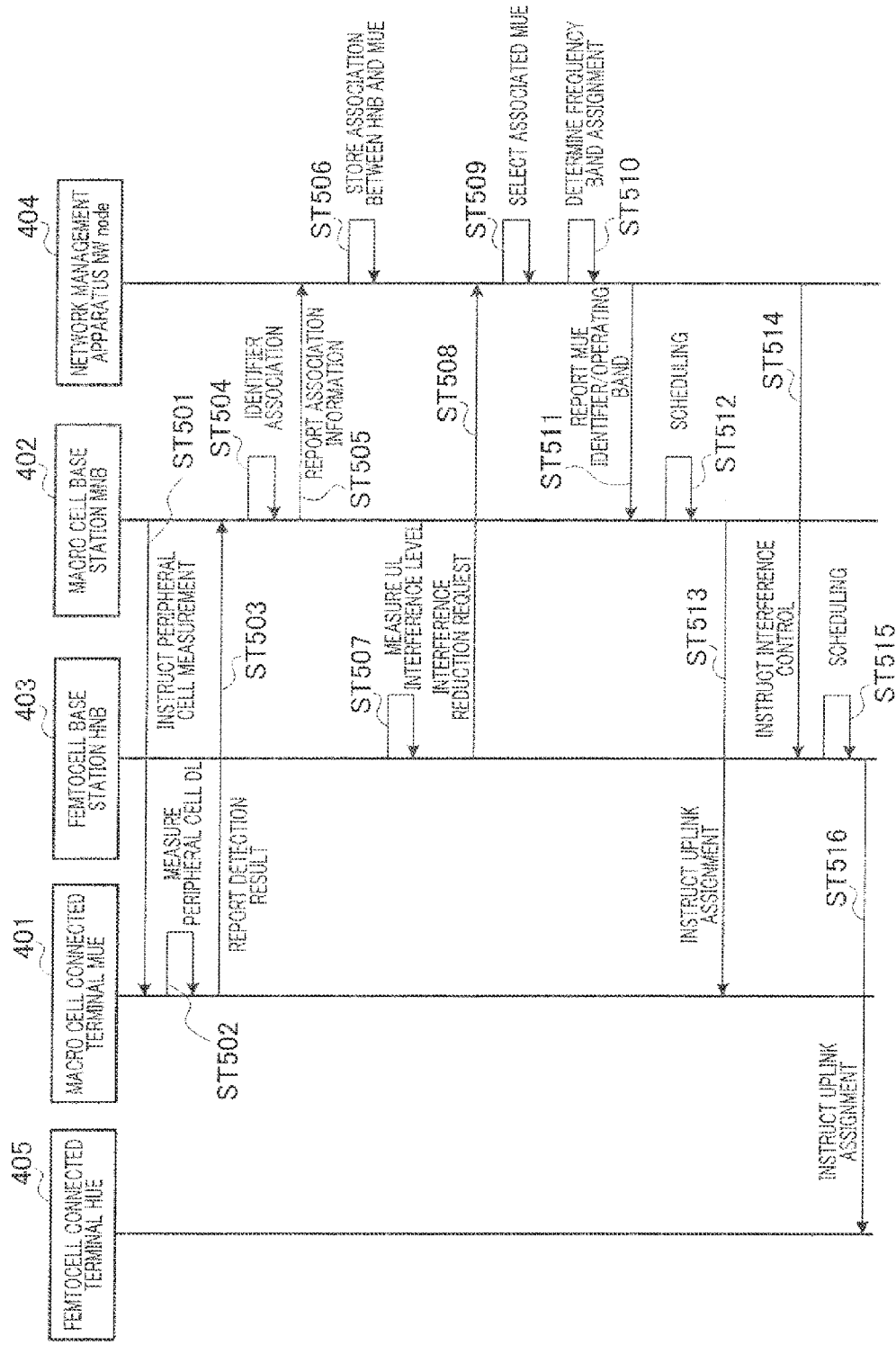
FIG. 6 is a sequence diagram illustrating an interference control procedure.

Next, operation of the mobile communication system having the above-described configuration will be described. FIG. 6 is a sequence diagram illustrating an interference control procedure.

In ST501 to ST506 of FIG. 6, a femtocell is associated with macro cell connected terminal 401 located in the periphery of the femtocell and the association is stored in storage section 4043 of network management apparatus 404.

That is, instruction section 4022 of macro cell base station 402 instructs macro cell connected terminal 401 to detect a peripheral cell through downlink measurement first (ST501). Macro cell connected terminal 401, which is the instruction target, is selected exclusively from among macro cell connected terminals 401 having insufficient actually measured downlink quality of the own cell compared to the channel quality expected from a measured value of space propagation loss.

Measuring section 4012 of macro cell connected terminal 401 measures the peripheral cell downlink based on the instruction from macro cell base station 402 (ST502). That is, measuring section 4012 detects femtocell base station 403 located in the periphery. As described above, the processing of detecting femtocell base station 403 may also be automatically performed based on conditions set in each macro cell connected terminal 401 (e.g., a predetermined cycle defined in a cell search procedure).

Measuring section 4012 of macro cell connected terminal 401 reports the detection result to macro cell base station 402 (ST503). This detection result includes the detected femtocell base station identifier and more preferably also includes the reception intensity of a downlink reference signal of the femtocell. Moreover, identification information of macro cell connected terminal 401 (that is, the terminal identifier) is added to this detection result.

Macro cell base station 402 associates the terminal identifier with the femtocell identifier detected in the terminal (ST504).

Macro cell base station 402 reports the identifier association information to network management apparatus 404 (ST505).

Storage section 4043 of network management apparatus 404 stores the association between the femtocell and macro cell connected terminal 401 (ST506). Here, when interference from macro cell connected terminal 401 to the femtocell is small, it may be possible to define so that reporting in step ST503 or ST505 is not performed to thereby reduce the amount of signaling. More specific definition examples will be described in detail from Embodiment 2 onward.

In steps from ST507 onward in which an uplink interference reduction request is actually generated, interference control is performed with reference to the association information stored beforehand.

Receiving section 4034 of femtocell base station 403 measures the uplink interference level from another cell connected terminal (e.g., macro cell connected terminal 401) based on the reception level of the uplink reference signal transmitted from femtocell connected terminal 405 located within the femtocell of the apparatus (ST507).

When interference control section 4032 of femtocell base station 403 decides that the uplink quality of the own cell cannot be maintained because the uplink interference level is high, interference control section 4032 sends an interference reduction request to network management apparatus 404 (ST508). This interference reduction request may include at least information on the uplink interference level, and in addition, also include the amount of uplink traffic of the femtocell or a desired frequency band in the femtocell.

Selection section 4042 of network management apparatus 404 selects macro cell connected terminal 401 associated in storage section 4043 with the identifier of femtocell base station 403, which is the sender of the interference reduction request received by receiving section 4044 (ST509).

Taking into account the contents of the interference reduction request from femtocell base station 403, interference control section 4045 of network management apparatus 404 determines uplink frequency band assignment so that the operating frequency band of the femtocell, which is the sender of the interference reduction request, and the operating frequency band of the macro cell connected terminal located near femtocell base station 403 do not overlap with each other (ST510).

Interference control section 4045 of network management apparatus 404 includes the identifier of the terminal selected in step ST509 and frequency band assignment determined in step ST510 in an interference reduction instruction and reports it to macro cell base station 402 (ST511). Network management apparatus 404 may also report the frequency band assignment determined in step ST510 to femtocell base station 403 (ST514). This allows femtocell base station 403 to grasp the frequency band used by macro cell connected terminal 401 without performing any radio measurement. This step ST514 is not a configuration essential to the implementation of the present invention and may be omitted.

Scheduler section 4023 of macro cell base station 402 performs frequency scheduling according to the report from network management apparatus 404 (that is, interference reduction instruction) (ST512). That is, scheduler section 4023 assigns the frequency band specified in the above-described report to macro cell connected terminal 401 specified in the above-described report.

Scheduler section 4023 transmits an uplink assignment instruction to macro cell connected terminal 401 based on the scheduling result (ST513). This prevents a specific frequency band from being assigned to macro cell connected terminal 401. Therefore, for this specific frequency band, interference with a femtocell located in the periphery of macro cell connected terminal 401 is reduced.

Scheduler section 4033 of femtocell base station 403 performs frequency scheduling by avoiding the operating frequency band of macro cell connected terminal 401 based on the report from network management apparatus 404 (that is, interference control instruction in ST514) or the uplink measurement result (ST515). Scheduler section 4033 transmits an uplink assignment instruction to femtocell connected terminal 405 based on the scheduling result (ST516).

Figure 7:
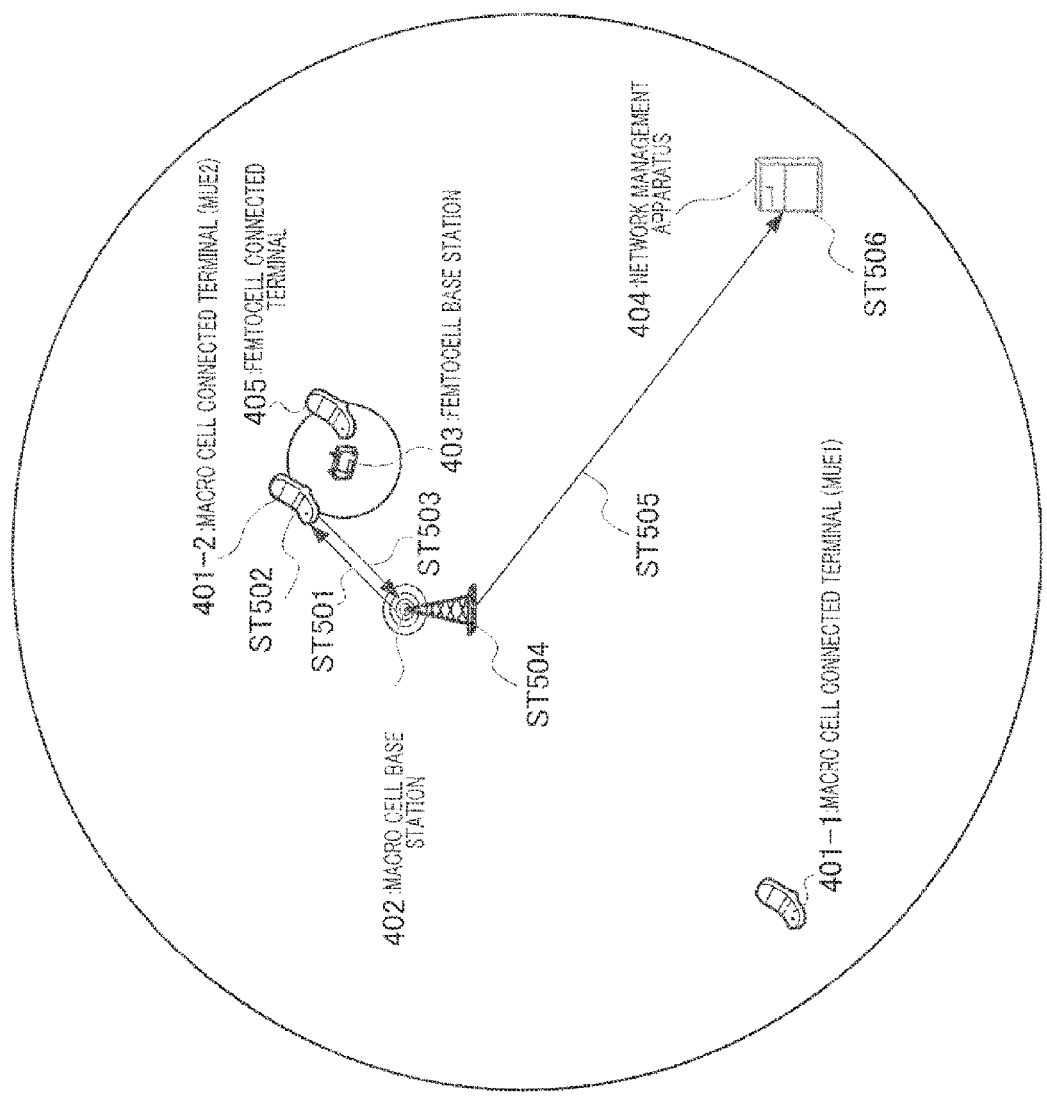
FIG. 7 is a diagram illustrating an example of a hierarchic cell arrangement and an interference control procedure.
Figure 8:
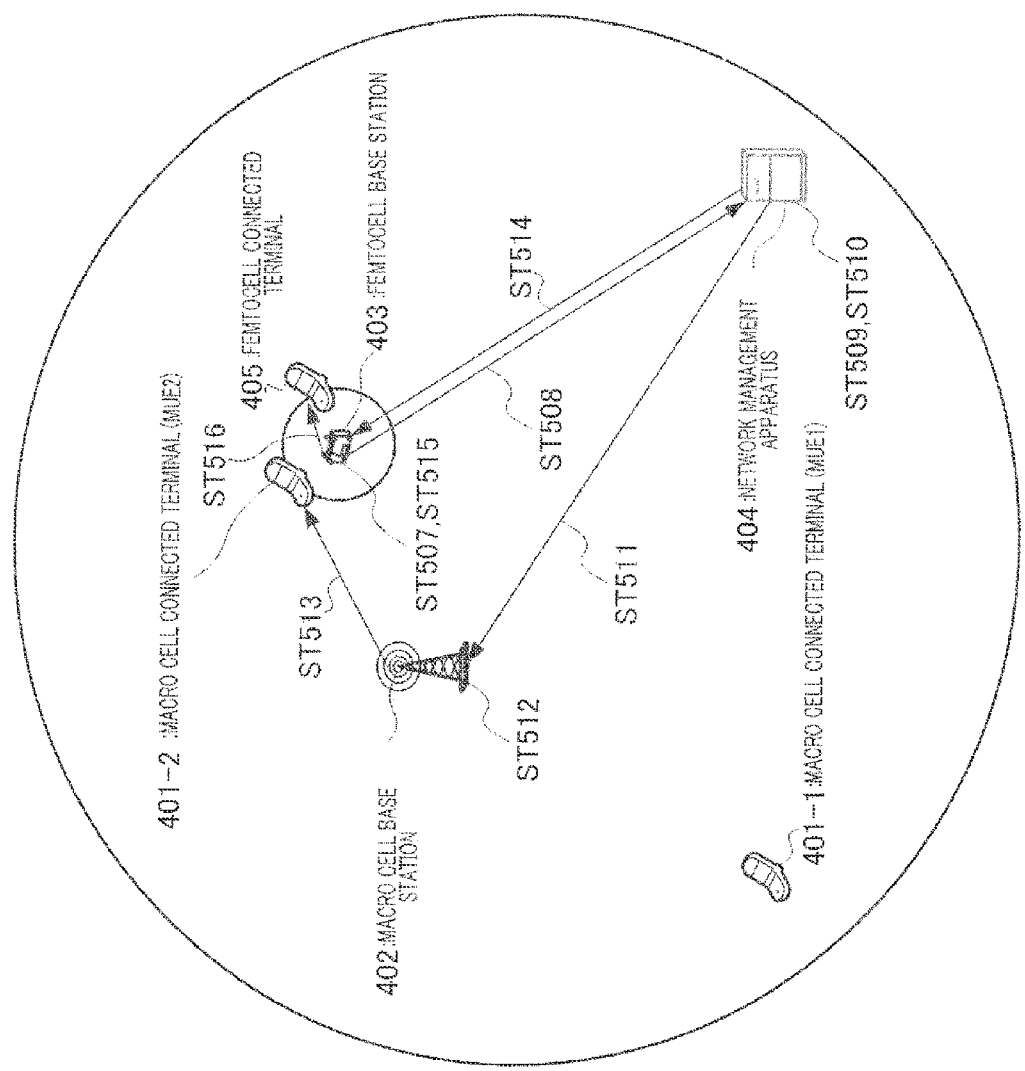
FIG. 8 is a diagram illustrating an example of a hierarchic cell arrangement and an interference control procedure.

FIG. 7 and FIG. 8 are diagrams illustrating examples of a hierarchic cell arrangement and interference control procedure. Especially, FIG. 7 shows the association processing in ST501 to ST506 and FIG. 8 shows an interference control procedure from ST507 onward.

In the hierarchic cell arrangement shown in FIG. 7 and FIG. 8, not macro cell connected terminal 401-1 (MUE1) but macro cell connected terminal 401-2 (MUE2) acts as an interference source with respect to femtocell base station 403. Due to the existence of interference from femtocell base station 403, the downlink quality of MUE2 deteriorates from the quality expected from space propagation loss between macro cell base station 402 and MUE2. Therefore, macro cell base station 402 selects MUE2 from among a plurality of macro cell connected terminals 401 and instructs it to measure the peripheral cell (ST501). MUE2 measures the reception level of a downlink common signal transmitted from femtocell base station 403 (that is, reference signal or the like) and receives an identifier of the femtocell (ST502). MUE2 then reports the peripheral cell detection result to macro cell base station 402 (ST503). Macro cell base station 402 associates the identifier of MUE2 with the identifier of the femtocell (ST504) and transmits the association information to network management apparatus 404 (ST505). Network management apparatus 404 stores the association information over a predetermined period (ST506).

A case will be considered here where uplink transmission of MUE2 provides serious interference with the femtocell in the hierarchic cell arrangement shown in FIG. 7 and FIG. 8.

Femtocell base station 403 measures the reception level of the uplink reference signal (ST507). As a result, femtocell base station 403 decides that the uplink quality of the own cell cannot be maintained because the uplink interference level is high and sends an interference reduction request to network management apparatus 404 (ST508).

Network management apparatus 404 receives the interference reduction request from femtocell base station 403 and selects MUE2, which is a macro cell connected terminal that is associated with the femtocell (ST509). Network management apparatus 404 takes into account contents of the interference reduction request from femtocell base station 403 and determines frequency band assignment so that the operating frequency band of femtocell connected terminal 405 is different from the operating frequency band of MUE2 (ST510). Network management apparatus 404 then reports the identifier of macro cell connected terminal MUE2 and the frequency band assignment determined in step ST510 to macro cell base station 402 (ST511). Furthermore, network management apparatus 404 also reports the frequency band assignment determined in step ST510 to femtocell base station 403 (ST514). Macro cell base station 402 and femtocell base station 403 each perform frequency scheduling on terminals connected to their own cells according to the contents reported from network management apparatus 404.

In the above-described example, no signaling is generated to macro cell connected terminal 401-1 (MUE1) located far from femtocell base station 403. Furthermore, at the stage at which the interference reduction request is transmitted from femtocell base station 403, macro cell connected terminal 401 is identified through the association to be a terminal acting as the interference source. Thus, it is possible to place frequency band limitation only on a specific terminal (here, MUE2) acting as the interference source without collecting information from all terminals again accompanying the generation of an interference reduction request.

As described above, according to the present embodiment, since terminals located near the femtocell are recorded in the network management apparatus before an interference reduction request from the femtocell is generated, it is possible to place frequency band limitation only on a specific terminal acting as the interference source without collecting information from all terminals again. This makes it possible to suppress consumption of radio resources due to an increase in signaling while maintaining responsivity of interference control to a change in the radio environment and reduce interference with an uplink radio channel from the macro cell connected terminal to the femtocell base station.

Embodiment 2

Embodiment 2 of the present invention decides the necessity of association in identifier association step ST504 described in Embodiment 1. The reception level of a downlink signal of the femtocell in the macro cell connected terminal is used for this decision. Therefore, in detection result reporting step ST503, the macro cell connected terminal reports the reception intensity of the downlink reference signal transmitted from the femtocell base station to the macro cell base station in addition to the identifier of the detected femtocell base station. The basic configuration and operation of the mobile communication system according to Embodiment 2 of the present invention are similar to those of Embodiment 1.

Figure 9:
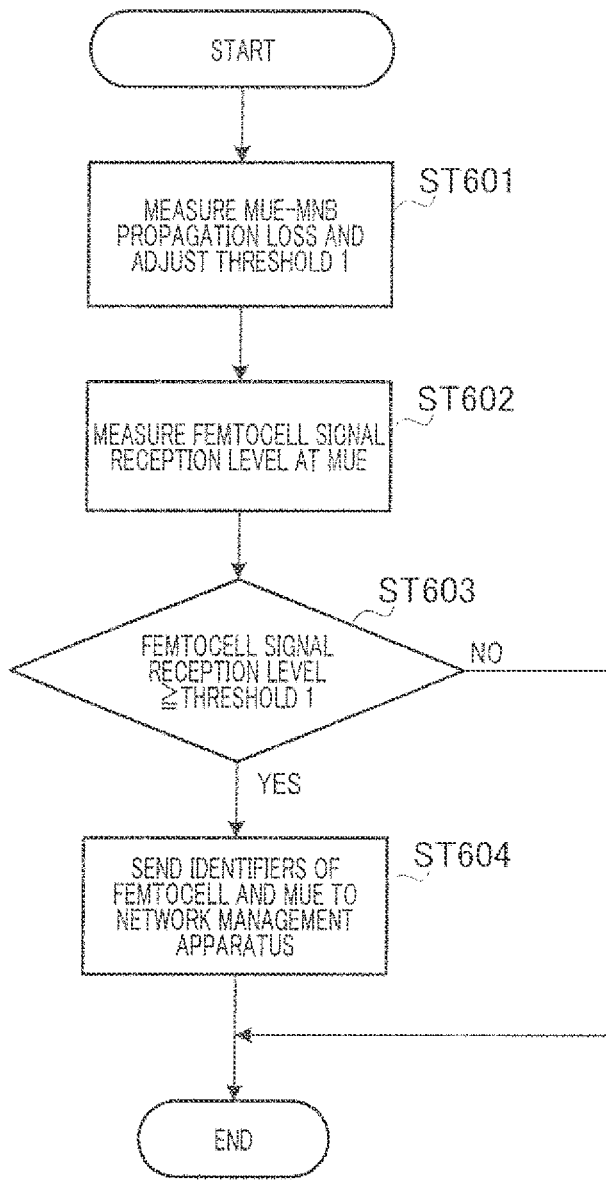
FIG. 9 is a flowchart illustrating an association information reporting procedure according to Embodiment 2 of the present invention.

FIG. 9 is a flowchart showing an identifier association step and an association information reporting step according to Embodiment 2 of the present invention. FIG. 9 clearly shows a flow in which macro cell base station 402 performs identifier association based on the detection result of femtocell base station 403 in macro cell connected terminal 401 and decides whether or not to report it to network management apparatus 404.

In FIG. 9, transmitting section 4021 of macro cell base station 402 adjusts decision threshold 1 in accordance with an adjustment of downlink transmission power of femtocell base station 403 (ST601). To be more specific, transmitting section 4021 lowers decision threshold 1 in accordance with an increase in space propagation loss between macro cell base station 402 and macro cell connected terminal 401 measured by receiving section 4025 using an uplink reference signal. That is, transmitting section 4021 lowers decision threshold 1 as the space propagation loss between macro cell base station 402 and macro cell connected terminal 401 increases. Furthermore, the reduction width of the threshold is made to be proportional to the adjustment width of downlink transmission power of femtocell base station 403.

Macro cell connected terminal 401 measures the reception level of a downlink reference signal transmitted from femtocell base station 403 (ST602). Here, the measured reception intensity is reported to macro cell base station 402.

Macro cell base station 402 performs identifier association based on the detection result of femtocell base station 403 in macro cell connected terminal 401 and decides whether or not to report it to network management apparatus 404 (ST603). Here, the reception level of the downlink signal of the femtocell in macro cell connected terminal 401 is used as a decision reference. To be more specific, transmitting section 4021 of macro cell base station 402 compares the reception level of a downlink signal of the femtocell with decision threshold 1. When the reception level is equal to or above decision threshold 1 (ST603:YES), transmitting section 4021 associates macro cell connected terminal 401 with femtocell base station 403 and reports the association information to network management apparatus 404 (ST604). The reasons for this are as follows: That is, when propagation loss between macro cell connected terminal 401 and femtocell base station 403 is small (ST603: NO), the amount of uplink interference from macro cell connected terminal 401 to femtocell base station 403 is deemed to increase and the possibility that an interference reduction request from femtocell base station 403 may be generated increases. On the other hand, when the reception level is lower than decision threshold 1, transmitting section 4021 does not associate macro cell connected terminal 401 with femtocell base station 403 and sends no report to network management apparatus 404.

Here, the downlink transmission power and cell coverage of femtocell base station 403 may change depending on the installation position of femtocell base station 403 in the macro cell. When, for example, femtocell base station 403 is installed at the macro cell edge, the level of downlink interference from macro cell base station 402 decreases, and therefore control may be performed so as to reduce downlink transmission power of femtocell base station 403. In this case, it is necessary to consider influences of the position in the macro cell of femtocell base station 403 to correctly make the decision in step ST603.

Thus, in the flow of FIG. 9, decision threshold 1 is adjusted in ST601 in accordance with the adjustment of downlink transmission power of femtocell base station 403. This improves the decision accuracy in ST603.

Figure 10:
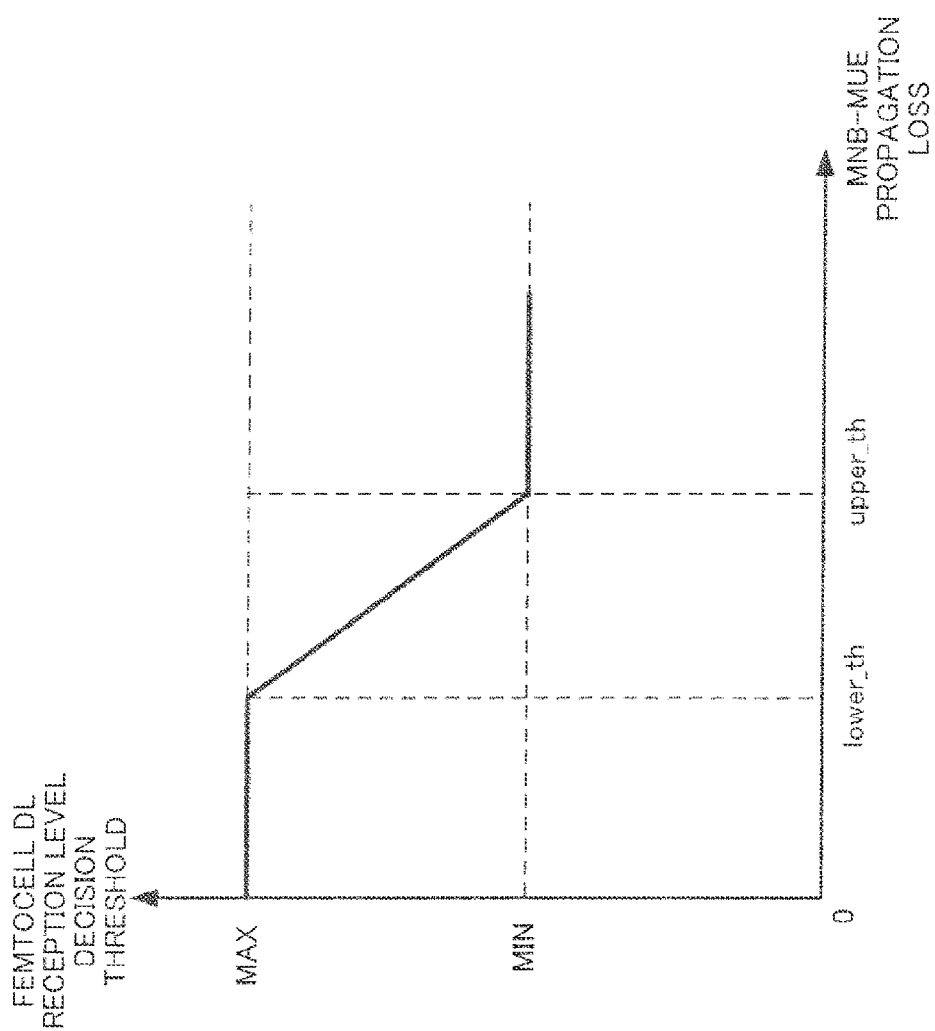
FIG. 10 is a diagram illustrating a decision threshold adjusting function according to Embodiment 2 of the present invention.

FIG. 10 shows an example of the function for adjusting the above-described decision threshold. In FIG. 10, the horizontal axis shows space propagation loss between the macro cell base station and the macro cell connected terminal, and the vertical axis shows the magnitude of decision threshold 1. In the example of FIG. 10, an upper limit and lower limit are set for decision threshold 1. When the value of space propagation loss is within a certain range (range between lower_th and upper_th in FIG. 10), decision threshold 1 decreases in proportion to the value of space propagation loss. The shape and adjustment width of the function are determined so as to match the function for adjusting downlink transmission power of femtocell base station 403.

A configuration has been adopted in the above-described method in which macro cell base station 402 makes a decision regarding identifier association and reporting to network management apparatus 404, but the present invention is not limited to this. For example, as another method, macro cell connected terminal 401 may make a decision on identifier association based on the reception level of a downlink reference signal transmitted from femtocell base station 403.

As described above, the present embodiment makes a condition decision using the reception level of a downlink reference signal transmitted from the femtocell base station, and can thereby associate only a terminal that can become an interference source with the femtocell base station and also reduce the amount of signaling necessary to report the association information.

Embodiment 3

Embodiment 3 of the present invention decides the necessity for association in identifier association step ST504 described in Embodiment 1. This decision uses a transmission power level of a macro cell connected terminal. To be more specific, when transmission power of the macro cell connected terminal is large, the amount of uplink interference provided to a nearby femtocell base station is also expected to increase, and therefore such a terminal is associated with the nearby femtocell base station in advance. This additional function makes it possible to further narrow down macro cell connected terminals associated with the femtocell base station. The basic configuration and operation of the mobile communication system according to Embodiment 3 of the present invention are similar to those of Embodiment 1.

Figure 11:
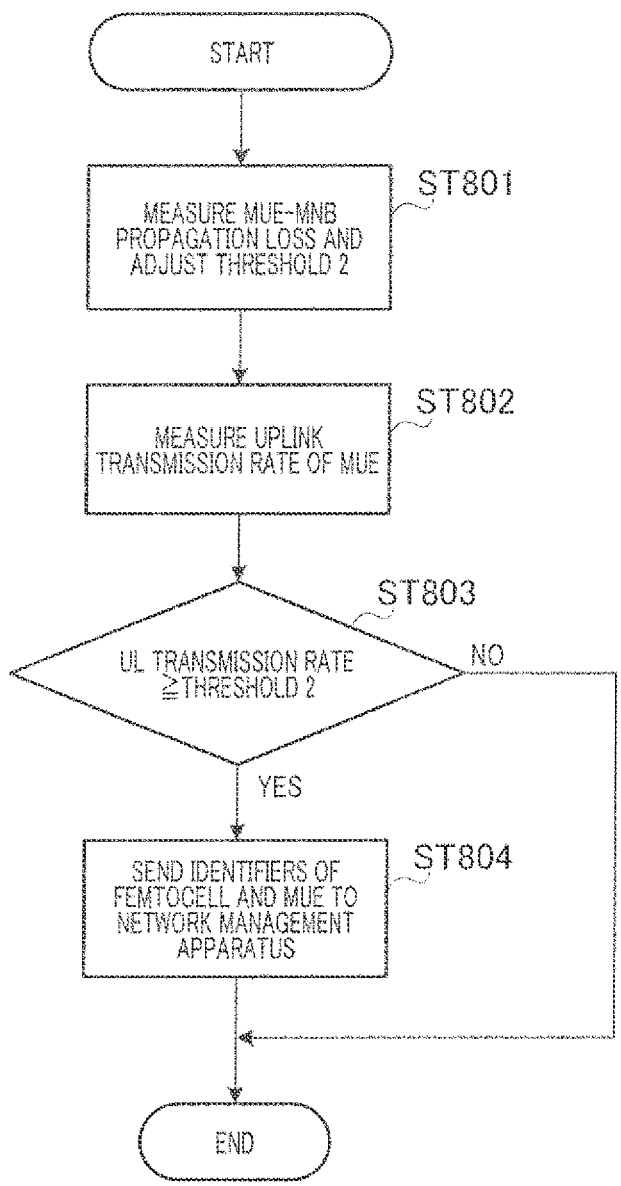
FIG. 11 is a flowchart illustrating an association information reporting procedure according to Embodiment 3 of the present invention.

FIG. 11 is a flowchart showing an identifier association step and an association information reporting step according to Embodiment 3 of the present invention. FIG. 11 discloses a decision method that reflects a transmission power level of macro cell connected terminal 401 based on an uplink transmission rate of macro cell connected terminal 401 and propagation loss between macro cell base station 402 and macro cell connected terminal 401.

In FIG. 11, transmitting section 4021 of macro cell base station 402 adjusts threshold 2 according to space propagation loss between macro cell base station 402 and macro cell connected terminal 401 (ST801). To be more specific, transmitting section 4021 lowers decision threshold 2 according to an increase of space propagation loss between macro cell base station 402 and macro cell connected terminal 401 measured by receiving section 4025 using an uplink reference signal. That is, transmitting section 4021 decreases decision threshold 2 as space propagation loss between macro cell base station 402 and macro cell connected terminal 401 increases.

Receiving section 4025 of macro cell base station 402 measures the uplink transmission rate of macro cell connected terminal 401 (ST802).

Macro cell base station 402 performs identifier association based on the detection result of femtocell base station 403 in macro cell connected terminal 401 and decides whether or not to report the identifier association to network management apparatus 404 (ST803). Here, the uplink transmission rate of macro cell connected terminal 401 is used as a decision reference. To be more specific, transmitting section 4021 compares the measured uplink transmission rate with threshold 2 (ST803). When the uplink transmission rate is equal to or above threshold 2 (ST803: YES), transmitting section 4021 associates macro cell connected terminal 401 with femtocell base station 403 and reports the association information to network management apparatus 404 (ST804). The reasons for this are as follows: That is, as the uplink transmission rate of the terminal increases, transmission power for satisfying the required data error rate generally increases, and therefore when the uplink transmission rate is equal to or above threshold 2, it is foreseen that macro cell connected terminal 401 provides a certain level of interference to peripheral femtocell base station 403. Since an increase in the uplink transmission rate is linked with an increase in the transmission power, the transmission power of macro cell connected terminal 401 may also be used as the decision reference.

On the other hand, when the uplink transmission rate is smaller than threshold 2 (ST803: NO), transmitting section 4021 does not associate macro cell connected terminal 401 with femtocell base station 403 and does not report it to network management apparatus 404.

Here, when the transmission rate of the terminal is constant, as space propagation loss between the terminal and the base station increases, the transmission power for satisfying the required data error rate increases, and therefore threshold 2 is adjusted according to the space propagation loss between macro cell base station 402 and macro cell connected terminal 401 in ST801.

Figure 12:
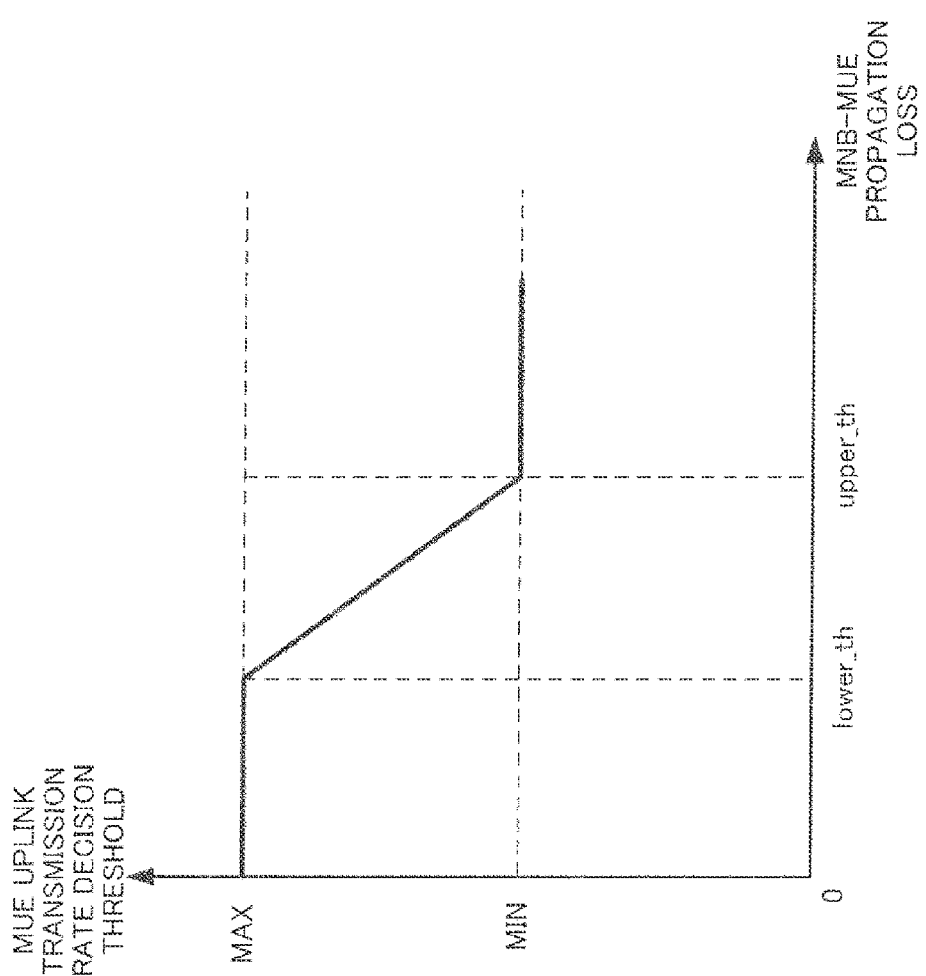
FIG. 12 is a diagram illustrating a decision threshold adjusting function according to Embodiment 3 of the present invention.

FIG. 12 shows an example of the above-described decision threshold adjusting function. In FIG. 12, the horizontal axis shows space propagation loss between the macro cell base station and the macro cell connected terminal, and the vertical axis shows the magnitude of decision threshold 2.

In the example of FIG. 12, an upper limit and lower limit are set for decision threshold 2. When the value of space propagation loss is within a certain range (within a range between lower_th and upper_th in FIG. 12), decision threshold 2 decreases in proportion to the value of space propagation loss.

Here, the shape and adjustment width of the function will be calculated as follows. First, an allowable amount of uplink interference in femtocell base station 403 is defined. One of macro cell connected terminals 401 is virtually arranged so that space propagation loss with respect to femtocell base station 403 becomes a fixed value. A maximum value of the terminal transmission rate that does not exceed the allowable amount of femtocell interference is set as a decision threshold in the virtual arrangement position. The function in FIG. 12 can be obtained by performing the above-described calculations according to positions in the macro cell.

The above-described method has adopted a configuration in which the macro cell base station makes a decision on identifier association and reporting to the network management apparatus, but the present invention is not limited to this. For example, as another method, macro cell connected terminal 401 may also make a decision on identifier association directly using transmission power of that terminal.

As described so far, the present embodiment makes a condition decision according to transmission power of macro cell connected terminal 401, and can thereby associate only macro cell connected terminal 401 which can become an interference source with femtocell base station 403 and reduce the amount of signaling required to report association information.

Other Embodiments (1) Embodiments 2 and 3 use the reception level of a downlink reference signal transmitted from femtocell base station 403 at macro cell connected terminal 401 or transmission power of macro cell connected terminal 401 as a decision condition for association between femtocell base station 403 and macro cell connected terminal 401. The present invention is not limited to the above-described embodiments, but can also acquire position information of femtocell base station 403 and macro cell connected terminal 401 through GPS or the like and perform association only when their geographical positions are close to each other. This produces effects of being able to remove influences such as variations in the accuracy of radio measurement of macro cell connected terminal 401 and time variations in a radio environment or the like, and perform stable association.

(2) With regard to peripheral femtocell detection by macro cell connected terminal 401, the above-described embodiments have described a method of performing peripheral femtocell detection based on an instruction from macro cell base station 402 and a method for macro cell connected terminal 401 to automatically perform peripheral femtocell detection in a predetermined cycle defined in, for example, a cell search procedure. When the former method is adopted, macro cell base station 402 can also instruct macro cell connected terminal 401 to periodically detect peripheral femtocells and update association information of network management apparatus 404. This produces effects of responding to a change in the radio environment due to a movement of macro cell connected terminal 401 or the like and appropriately associating macro cell connected terminal 401, which becomes an interference source, with femtocell base station 403. Regarding the update cycle, network management apparatus 404 can change the update cycle based on, for example, the number of femtocells installed in the macro cell or the number of terminals or the like.

Furthermore, when association between the femtocell and the macro cell connected terminal changes, network management apparatus 404 can also send signaling for updating contents of an interference reduction instruction to macro cell base station 402. This produces effects of being able to respond to a change in association due to a movement of macro cell connected terminal 401 or the like and appropriately perform frequency band limitation on macro cell connected terminal 401 which becomes an interference source.

(3) It is an object in the above-described embodiments to reduce interference with an uplink radio channel from macro cell connected terminal 401 to femtocell base station 403, but it is also possible to apply the essence of the present invention to uplink radio channel interference between neighboring femtocells. That is, femtocell base station 403 or femtocell connected terminal 405 can measure downlink signals of neighboring femtocells and detect information, and associate between neighboring femtocells. When desiring to reduce uplink radio channel interference, femtocell base station 403 sends an interference reduction request to neighboring femtocell base station 403 first and attempts to perform interference control between neighboring femtocell base stations 403. When desired interference reduction is not possible, femtocell base station 403 sends an interference reduction request to macro cell base station 402 through network management apparatus 404. This produces an effect of being able to reduce interference between neighboring femtocells through appropriate frequency band assignment.

(4) In the above-described embodiments, frequency band assignment to macro cell connected terminal 401 or femtocell connected terminal 405 is adjusted to reduce uplink interference between macro cell base station 402 and femtocell base station 403, and in addition to this, network management apparatus 404 may also adjust transmission power assignment or transmission timing assignment to macro cell connected terminal 401 or femtocell connected terminal 405 and instruct macro cell base station 402 or femtocell base station 403 on such assignment. This makes it possible to further reduce uplink interference between macro cell base station 402 and femtocell base station 403.

(5) A configuration has been adopted in the above-described embodiments in which storage section 4043 of network management apparatus 404 stores association between femtocell base station 403 and macro cell connected terminal 401, selection section 4042 selects a terminal which becomes an interference source and interference control section 4045 performs frequency band assignment, but it is also possible to adopt a configuration in which functions of all the sections are shifted to macro cell base station 402 or femtocell base station 403 without changing the essence of the present invention.

(6) An example has been described in the above-described embodiments where the present invention is configured by hardware, but the present invention can also be implemented by software. To be more specific, function blocks used in the descriptions of the above embodiments can be realized as software modules.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-190431, filed on Aug. 19, 2009, including the specification, drawings and abstract is incorporated herein by reference in its entirety.

INDUSTRIAL APPLICABILITY

The mobile communication system, network management apparatus, base station apparatus and interference control method of the present invention are suitable for use in reducing uplink radio channel interference from a macro cell connected terminal to a femtocell base station.

REFERENCE SIGNS LIST

401 macro cell connected terminal
402 macro cell base station
403 femtocell base station
404 network management apparatus
405 femtocell connected terminal
4011, 4021, 4031, 4041, 4051 transmitting section
4012, 4052 measuring section
4013, 4025, 4034, 4044, 4053 receiving section
4022 instruction section
4023, 4033 scheduler section
4024, 4032, 4045 interference control section
4042 selection section
4043 storage section

The invention claimed is:

1. A mobile communication system comprising:
a macro cell base station;
a macro cell connected terminal wirelessly connected to the macro cell base station;
a femtocell base station;
a femtocell connected terminal wirelessly connected to the femtocell base station; and
a network management apparatus connected to the femtocell base station and the macro cell base station, wherein:

the macro cell connected terminal comprises:
a measuring section that detects whether or not a femtocell base station is located in a periphery of the macro cell connected terminal; and
a transmitting section that transmits, when the presence of the femtocell base station is detected in the periphery, a peripheral femtocell detection result to the macro cell base station, the macro cell base station comprises:
a transmitting section that transmits an identifier of the macro cell connected terminal and the peripheral femtocell detection result to the network management apparatus based on the detection result transmitted from the macro cell connected terminal;
a receiving section that receives an interference reduction instruction transmitted from the network management apparatus; and
a scheduler section that limits assignment of a frequency band to the macro cell connected terminal based on the interference reduction instruction, the femtocell base station comprises:
an interference control section that transmits, upon deciding that uplink quality of a femtocell of the femtocell base station cannot be maintained, an interference reduction request to the network management apparatus; and
a scheduler section that limits assignment of a frequency band to the femtocell connected terminal based on the interference control instruction transmitted from the network management apparatus, the network management apparatus comprises:
a storage section that stores information on a correspondence relationship between the identifier of the macro cell connected terminal and an identifier of the femtocell base station;
a receiving section that receives an interference reduction request transmitted from the femtocell base station;
an interference control section that determines frequency band assignment so that operating frequency bands of the femtocell base station and the macro cell base station do not overlap with each other for the macro cell connected terminal in the correspondence relationship with the femtocell base station based on the received interference reduction request and the information on the correspondence relationship stored in the storage section; and
a transmitting section that transmits an interference reduction instruction including information of the frequency band assignment to the macro cell base station.

2. The mobile communication system according to claim 1, wherein when reception intensity of a downlink reference signal of the femtocell measured by the macro cell connected terminal is equal to or above a first threshold, the macro cell base station sends an identifier of the femtocell base station to the network management apparatus.

3. The mobile communication system according to claim 2, wherein the first threshold is lowered in proportion to an increase in propagation loss between the macro cell base station and the macro cell connected terminal.

4. The mobile communication system according to claim 1, wherein the macro cell base station sends an identifier of the femtocell base station to the network management apparatus only when transmission power of the macro cell connected terminal is equal to or above a second threshold.

5. The mobile communication system according to claim 1, wherein the macro cell base station sends an identifier of the femtocell base station from the macro cell base station to the network management apparatus only when an uplink transmission rate in the macro cell connected terminal is equal to or above a third threshold.

6. The mobile communication system according to claim 5, wherein the third threshold is lowered in proportion to an increase in propagation loss between the macro cell base station and the macro cell connected terminal.

7. A network management apparatus comprising:
a storage section that stores information on a correspondence relationship between an identifier of a macro cell connected terminal wirelessly connected to a macro cell base station and an identifier of a femtocell base station detected by the macro cell connected terminal;
a receiving section that receives an interference reduction request transmitted from the femtocell base station;
a selection section that selects the identifier of the macro cell connected terminal corresponding to the femtocell base station which transmits the interference reduction request to the network management apparatus, based on the correspondence relationship information;
an interference control section that determines frequency band assignment so that operating frequency bands of the femtocell base station and the macro cell base station do not overlap with each other based on the interference reduction request and the correspondence relationship information stored in the storage section; and
a transmitting section that transmits an interference reduction instruction including the identifier of the macro cell connected terminal selected by the selection section and the information of the frequency band assignment to the macro cell base station.

8. A macro cell base station apparatus comprising:
an instruction section that instructs a macro cell connected terminal connected to the macro cell base station to detect a cell identifier of a femtocell base station located in a periphery of the macro cell connected terminal;
a receiving section that receives a peripheral femtocell detection result of the femtocell base station, an interference reduction instruction, and terminal identifier information, the peripheral femtocell detection result being transmitted from the macro cell connected terminal, and the interference reduction instruction being transmitted from a network management apparatus;
a transmitting section that transmits an identifier of the macro cell connected terminal and the peripheral femtocell detection result to the network management apparatus based on the detection result from the macro cell connected terminal;
an interference control section that adjusts radio resource assignment to the macro cell connected terminal specified by the identifier information based on the interference reduction instruction; and
a scheduler section that limits frequency band assignment to the macro cell connected terminal according to the adjustment of the interference control section.

9. An interference control method used for a mobile communication system provided with a macro cell base station, a femtocell base station and a network management apparatus, comprising:
the macro cell connected terminal wirelessly connected to the macro cell base station detecting whether or not a femtocell base station is located in a periphery of the macro cell connected terminal;
transmitting, when the presence of the femtocell base station is detected in the periphery, a peripheral detection result to the macro cell base station;
the macro cell base station transmitting an identifier of the macro cell connected terminal and the peripheral femtocell detection result to the network management apparatus based on the detection result transmitted from the macro cell connected terminal;
receiving an interference reduction instruction transmitted from the network management apparatus; and
limiting frequency band assignment to the macro cell connected terminal based on the received interference reduction instruction,
the femtocell base station transmitting, upon deciding that uplink quality of a femtocell of the femtocell base station cannot be maintained, an interference reduction request to the network management apparatus; and
limiting frequency band assignment to the terminal wirelessly connected to the competent femtocell based on the interference control instruction transmitted from the network management apparatus,
the network management apparatus maintaining information on a correspondence relationship between the identifier of the macro cell connected terminal and an identifier of the femtocell base station;
receiving an interference reduction request transmitted from the femtocell base station;
determining frequency band assignment so that operating frequency bands of the femtocell base station and the macro cell base station do not overlap with each other for the macro cell connected terminal in the correspondence relationship with the femtocell base station based on the received interference reduction request and the correspondence relationship information stored in the storage section; and
transmitting an interference reduction instruction including the information of the frequency band assignment to the macro cell base station.

* * * * *